US012728610B2

(12) United States Patent
Parisot

(10) Patent No.: US 12,728,610 B2
(45) Date of Patent: Sep. 8, 2026

(54) ASSEMBLY PRESS TOOLHOLDER

(71) Applicant: ROLEX SA, Geneva (CH)

(72) Inventor: Guillaume Parisot, Copponex (FR)

(73) Assignee: ROLEX SA, Geneva (CH)

( * ) Notice: Subject to any disclaimer, the term of this patent is extended or adjusted under 35 U.S.C. 154(b) by 574 days.

(21) Appl. No.: 18/304,505

(22) Filed: Apr. 21, 2023

(65) Prior Publication Data

US 2023/0339201 A1 Oct. 26, 2023

(30) Foreign Application Priority Data

Apr. 25, 2022 (EP) .................................... 22169829

(51) Int. Cl.
*B25B 5/00* (2006.01)
*B30B 15/06* (2006.01)

(52) U.S. Cl.
CPC .................................. *B30B 15/065* (2013.01)

(58) Field of Classification Search
CPC .... B25B 1/00; B25B 1/02; B25B 1/04; B25B 1/08; B25B 1/14; B25B 3/00; B25B 5/04; B25B 5/00
See application file for complete search history.

(56) References Cited

U.S. PATENT DOCUMENTS 2,503,426 A * 4/1950 Tower ..................... B25B 27/02 29/283
5,557,833 A * 9/1996 Pool ...................... B25B 27/023 29/261
5,896,639 A * 4/1999 Chen ..................... B25B 27/026 29/261
6,003,360 A 12/1999 Runk et al.
6,446,485 B1 9/2002 Tarasconi
7,216,409 B1 * 5/2007 Chiu ..................... B25B 27/023 29/259
8,146,221 B2 * 4/2012 Hung .................... B25B 27/026 29/244
8,826,505 B2 * 9/2014 Dines ....................... B25J 15/00 29/244

(Continued)

FOREIGN PATENT DOCUMENTS

EP 1470872 A1 10/2004
EP 3424645 A1 1/2019

(Continued)

OTHER PUBLICATIONS

European Office Action dated Nov. 25, 2024 in priority application No. EP22169829.3; with English machine translation (total 10 pages).

(Continued)

*Primary Examiner* — Lee D Wilson
(74) *Attorney, Agent, or Firm* — Seckel IP, PLLC

(57) ABSTRACT

Toolholder (10) for a press (100), in particular for an assembly press (100) having an axis (A11), an actuation member (14), and retaining elements (17*a*, 17*b*, 17*c*, 17*d*) arranged to retain a tool (20), the toolholder being configured and/or arranged so that the retaining elements (17*a*, 17*b*, 17*c*, 17*d*) are movable from an activated position to a deactivated position by virtue of a movement in a first direction of the actuation member (14), in particular by an elementary movement in the first direction of the actuation member (14).

18 Claims, 8 Drawing Sheets

(56) References Cited

U.S. PATENT DOCUMENTS

| | | | | |
|---|---|---|---|---|
| 8,984,728 | B2 * | 3/2015 | Chen | B25B 27/023 29/258 |
| 2009/0236573 | A1 * | 9/2009 | Hu | B66F 3/36 254/100 |
| 2013/0221593 | A1 * | 8/2013 | Melchior | B25B 5/14 269/107 |
| 2014/0110557 | A1 * | 4/2014 | Dines | E03C 1/266 248/637 |
| 2019/0009346 | A1 | 1/2019 | Kreuzer | |
| 2020/0101510 | A1 | 4/2020 | Ruppert et al. | |

FOREIGN PATENT DOCUMENTS

| | | | |
|---|---|---|---|
| EP | 3424645 | B1 | 5/2021 |
| JP | 6713010 | B2 | 6/2020 |
| WO | 0059654 | A1 | 10/2000 |

OTHER PUBLICATIONS

European Search Report and Written Opinion dated Oct. 14, 2022 in priority application No. EP22169829.3; with English partial translation and partial machine translation (total 22 pages).

* cited by examiner

ASSEMBLY PRESS TOOLHOLDER

This application claims priority of European patent application No. EP22169829.3 filed Apr. 25, 2022, the content of which is hereby incorporated by reference herein in its entirety.

BACKGROUND ART

The invention concerns a press toolholder. The invention also concerns a press comprising such a toolholder. The invention further concerns a method of operating such a toolholder.

Driving is a well-known technique in horology. It is usually implemented by means of presses and the like comprising a tool designed to apply a force to a first component against a second component resting on a frame of the press so as to cause conformations of the first and second components to penetrate the one in the other. The tool is generally a dedicated tool matched to the geometry of the first component and which is interchangeable in order to enable assembly of all kinds of components on the same press or the like. An operator may therefore be called upon to change tools frequently to carry out assemblies of different ranges, for example during the same day.

This operation of changing tools can prove tiresome because it requires lengthy holding and/or manipulation of the tool in order to mount it properly on a toolholder, for example by screwing it on. Tool changing operations repeated frequently can eventually generate risks of Musculoskeletal Disorders (MSDs) for an operator.

The document JP6713010B2 discloses a solution representative of the prior art in which a tool of a manual press is fixed to a toolholder by means of a screw. That screw is screwed to the toolholder in a direction perpendicular to the longitudinal axis of the tool so that its end can apply a radial force to said tool and thus retain it within a housing formed on the toolholder. The operation of mounting the tool therefore requires the tool to be held in the toolholder during the screwing step. The operator must therefore at the same time screw in the screw and hold the tool in the toolholder during the mounting operation.

Screwing a tool directly to a toolholder is also known. To this end, the tool comprises a male thread designed to cooperate with a female thread on the toolholder or vice versa. In this situation the operator has to manipulate, in particular in rotation and in translation, a tool that may be heavy, and to do this within a limited space.

For its part the document EP3424645B1 discloses a solution of bayonet type more particularly suited to use of a coupling intended to connect an interchangeable tool to a portable press device. To this end an interchangeable tool comprises in particular nesting elements designed to cooperate with retaining elements of a toolholder once the tool has been introduced into the toolholder and rotated therein. The nesting and retaining elements are fixed relative to the tool and to the toolholder, respectively. It is therefore manipulations effected by the operator, in particular rotation of the tool, that enable the cooperation of the nesting and retaining elements.

SUMMARY OF THE INVENTION

The aim of the invention is to provide a toolholder enabling improvement of the toolholders known from the prior art. In particular, the invention proposes a toolholder that enables easy, reliable and rapid fixing of a tool to the toolholder.

A toolholder according to the invention is defined by point 1 below.

1. Toolholder for a press, in particular for an assembly press having:
   - an axis, and
   - comprising:
   - an actuation member, and
   - retaining elements arranged to retain a tool, the toolholder being configured and/or arranged so that the retaining elements are movable from an activated position to a deactivated position by virtue of a movement in a first direction of the actuation member, in particular by virtue of an elementary movement in the first direction of the actuation member.

Embodiments of the toolholder are defined by points 2 to 10 below.

2. Toolholder according to point 1, characterised in that the toolholder is configured and/or arranged so that the retaining elements are movable from a deactivated position to an activated position by virtue of a movement in a second direction opposite the first direction of the actuation member, in particular by virtue of an elementary movement in the second direction of the actuation member.
3. Toolholder according to point 1 or 2, characterised in that the toolholder is configured and/or arranged so that the retaining elements are movable from a deactivated position to an activated position by introduction of a tool into the toolholder.
4. Toolholder according to any one of the preceding points, characterised in that the actuation member is articulated in rotation about an axis and/or in that the retaining elements are articulated in rotation about axes, the axes being in particular in a plane or in a plurality of planes perpendicular to the axis of the toolholder.
5. Toolholder according to the preceding point, characterised in that the retaining elements are claws each featuring a bend and in that:
   - each claw is articulated in rotation at the level of its bend, in particular by means of a pin mounted in a frame of the toolholder, and/or
   - the claws are distributed equally or substantially equally around the axis of the toolholder.
6. Toolholder according to any one of the preceding points, characterised in that the retaining elements are biased elastically by an elastic return element, in particular springs, in particular coil springs arranged parallel to the axis.
7. Toolholder according to the preceding point, characterised in that the actuation member is elastically biased by the elastic elements, in particular by means of a cam kinematically connecting the actuation member and the elastic element.
8. Toolholder according to any one of the preceding points, characterised in that the toolholder comprises a cam, the retaining elements being movable relative to their respective axes by the cam.
9. Toolholder according to the preceding point, characterised in that the actuation member comprises a fork and in that the cam is movable, in particular in translation, by movement of the fork.

10. Toolholder according to any one of the preceding points, characterised in that the actuation member comprises:
   - a lever adapted to be actuated, in particular by an operator, for example a lever provided with a handle and/or with a bend, and
   - a shaft articulated about an axis, the shaft comprising in particular the fork or the shaft and the fork being fixed the one to the other, the lever and the shaft being fixed the one to the other, in particular in a perpendicular or substantially perpendicular manner.

A tool according to the invention is defined by point 11 below.

11. Tool comprising:
   - a support having a geometry, in particular a first bearing surface, a second bearing surface and a periphery, configured to cooperate with a toolholder according to any one of the preceding points, and
   - a driving ring.

A press according to the invention is defined by point 12 below.

12. Press comprising a toolholder according to anyone of points 1 to 10 and/or a tool according to point 11.

An operating method according to the invention is defined by point 13 below.

13. Method of operating a toolholder according to any one of points 1 to 10, characterised in that it comprises:
   - a step of movement of the actuation member in a first direction, in particular an elementary movement in a first direction of the actuation member, by an operator,
   - a step of deactivation of the retaining elements by the movement step leading to release of a tool.

Embodiments of the operating method are defined by points 14 and 15 below.

14. Method of operating a toolholder according to any one of points 1 to 10, characterised in that it comprises:
   - a step of movement of the actuation member in a first direction, in particular an elementary movement in a first direction of the actuation member, by an operator,
   - a step of deactivation of the retaining elements by virtue of the movement step,
   - a step of introducing a tool into the toolholder,
   - a step of movement of the actuation member in a second direction opposite the first direction, in particular a step of elementary movement in the second direction of the actuation member, by an elastic return element.
15. Method according to point 13 or 14 of operating a toolholder, characterised in that it comprises:
   - a step of bringing a tool and the toolholder into contact,
   - a step of application of a force by the tool to the toolholder so as to retract the retaining elements and to place the tool in the toolholder,
   - a step of activation of the retaining elements by an elastic return element.

BRIEF DESCRIPTION OF THE DRAWINGS

The appended drawings represent one embodiment of a press according to the invention by way of example.

DETAILED DESCRIPTION OF PARTICULAR EMBODIMENTS

Figure 1:
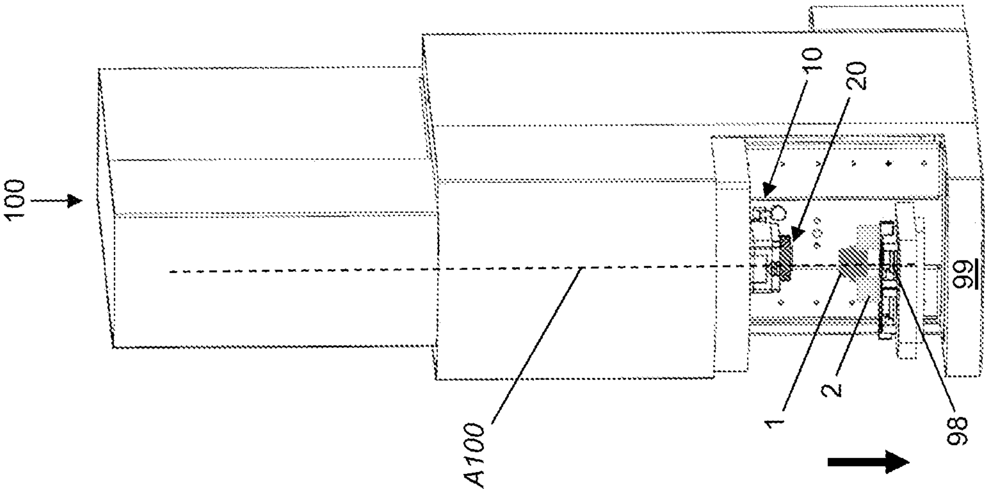
FIG. 1 is a perspective view of one embodiment of a press.

One embodiment of a press 100 according to the invention is described hereinafter with reference to the figures, in particular with reference to FIGS. 1 and 2.

The press 100 (or the like) is designed to enable the driving of a first component 1 against a second component 2 along a longitudinal axis A100. In particular, the driving operation consists in causing a first conformation of one of the components to penetrate, in particular to penetrate by force, into a second conformation of the other of the components.

To carry out the driving operation, the press applies a force to the first component 1 via a tool 20, in particular via a driving ring 22. This force is transmitted to the second component 2, then a support 98 on which the second component 2 is disposed, then a frame 99 of the press 100 on which the support 98 is disposed or fixed.

The driving ring 22 in particular makes it possible:
- to assure good positioning, in particular good orientation, of the first component during driving, and
- to limit zones of intense pressure on the first component in order not to mark it.

The support 98 makes it possible in particular:
- to assure good positioning, in particular good orientation, of the second component during driving, and
- to limit zones of intense pressure on the second component in order not to mark it.

The press 100 comprises a toolholder 10 and a tool 20. The tool 20 is mounted on the press 100 by means of the toolholder.

Figure 2:
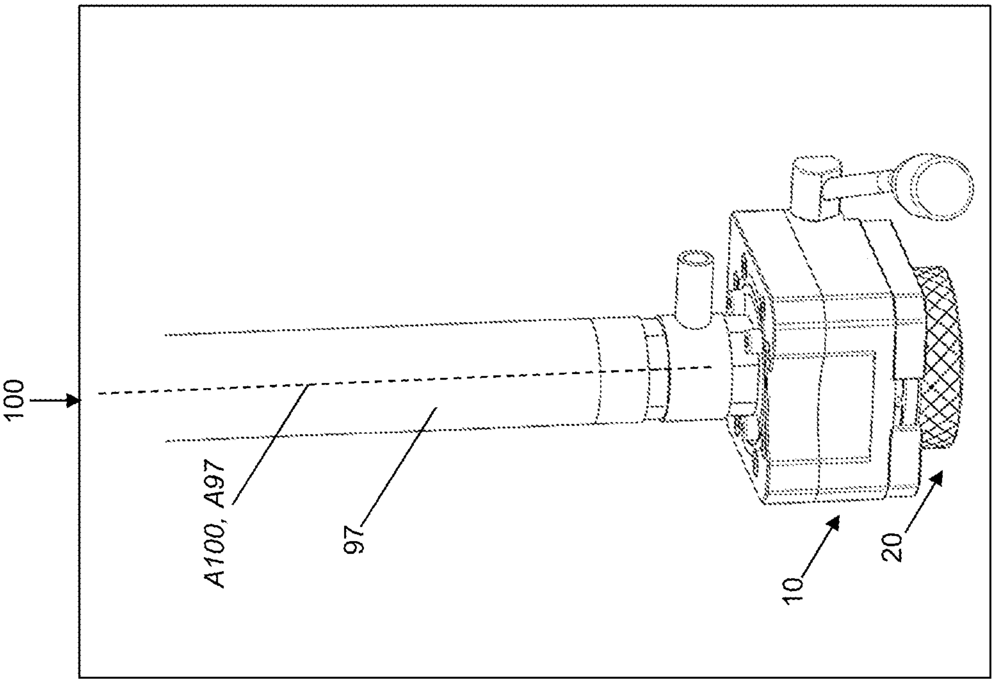
FIG. 2 is a view of a detail of the press at the level of a toolholder.

FIG. 2 depicts a view of a detail of the toolholder 10 in which the tool 20 is mounted. The toolholder 10 is fixed, in particular screwed, to a slider 97 integrated into the press 100. This slider 97 comprises in particular a body having a cylindrical shape with a geometrical axis A97 that coincides with the axis A100.

The movement in translation of the slider 97 along the axis A100 toward the support 98, as represented by the thick arrow in FIG. 1, causes the tool 20 to move toward the first component 1 previously positioned on the second component 2 until the tool 20 comes into contact with the first component 1, thereafter to enable assembly by driving the first component 1 onto the second component 2.

The speed of movement in translation of the slider 97 along the axis A100 and the force that is applied to it enable definition of forcible and/or positional driving of the first component on the second component or abutted driving of the first component against the second component.

The press 100 is preferably an assembly press, namely a press or the like enabling assembly of a first component and a second component, in particular by a driving process. The press 100 represented in FIG. 1 is an automatic press, in particular a servopress, namely a press provided with a servomotor (electric motor and control system). Alternatively, the press 100 may be a manual press, that is to say a press utilising energy furnished by an operator.

Figure 3:
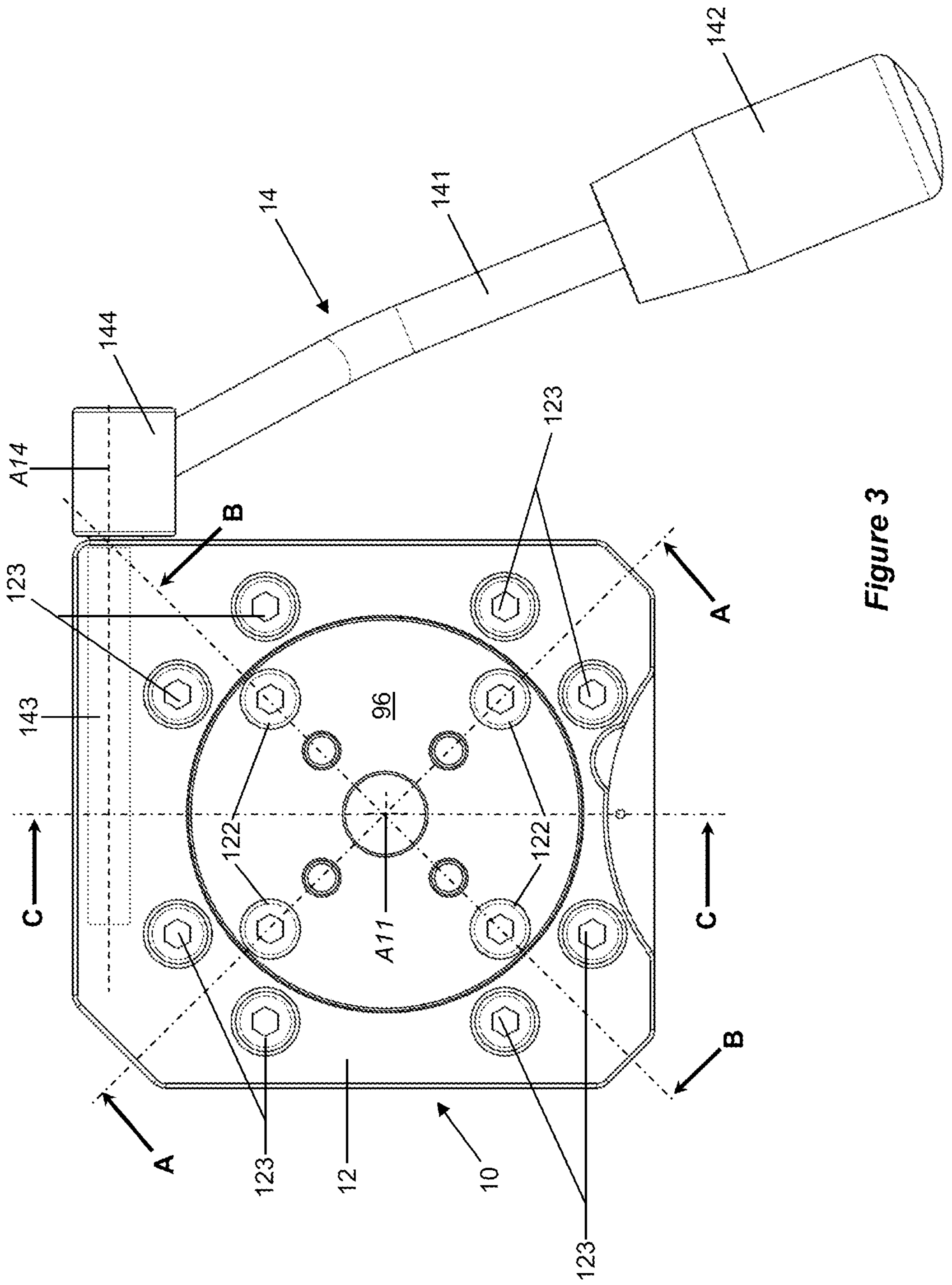
FIG. 3 is a view of the toolholder from above.

FIG. 3 represents a view from above of the toolholder 10 and of the tool 20 and identifies various planes on which are taken various longitudinal (relative to an axis A11 of the toolholder) sections shown in FIGS. 5 to 9.

Figure 4:
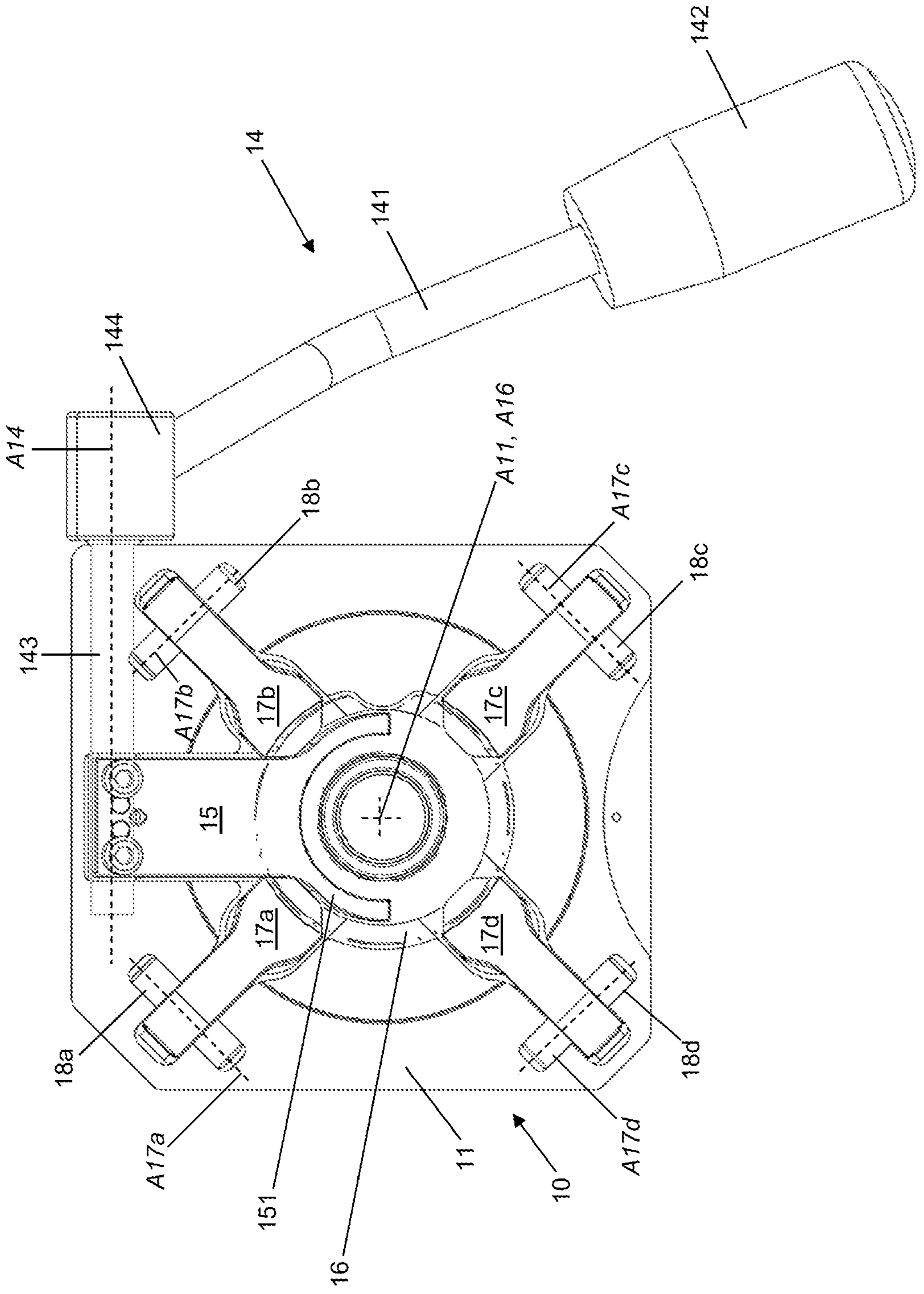
FIG. 4 is a view of the toolholder from above showing elements of the toolholder (not visible in FIG. 3).

FIG. 4 represents the same view from above as that of FIG. 3 but exposes components of the toolholder 10.

The toolholder 10 has:

an axis A11, and comprises:

an actuation member 14, and retaining elements 17*a*, 17*b*, 17*c*, 17*d* adapted to retain the tool 20.

The toolholder is configured and/or arranged so that the retaining elements 17*a*, 17*b*, 17*c*, 17*d* are movable from an activated position to a deactivated position by movement in a first direction of the actuation member 14, in particular by an elementary movement in the first direction of the actuation member 14.

The axis A11 is preferably intended to coincide with the axes A97 and A100 when the toolholder 10 is mounted on the press 100.

In particular, FIGS. 3 and 4 show distinctly the actuation member 14 of the toolholder 10, which here is articulated in rotation about an axis A14 in a plane perpendicular to the axis A97 of the slider 97 or perpendicular to the axis A11 corresponding to the geometric axis of a housing 11 of the toolholder 10, which is in particular designed to receive the components of the toolholder 10, as represented in FIGS. 5 to 9.

In this form of construction the actuation member 14 has a bent shape. The actuation member 14 comprises:

an arm or lever 141 fitted with an actuation handle 142, and a shaft 143 articulated about the axis A14.

The components 141 and 143 are interconnected or fixed the one to the other in a perpendicular or substantially perpendicular manner by a connecting element 144. The actuation member, in particular the lever 141, can be actuated manually, in particular downwards, by an operator.

As indicated above, to move the retaining elements 17*a*, 17*b*, 17*c*, 17*d* from an activated position to a deactivated position it suffices to move the actuation member 14 in an elementary movement:

in a single direction from a first abutment to a second abutment, and in rotation or in translation.

In the embodiment represented the movement is a rotation. The amplitude of the rotation movement is preferably less than 20° or 10°, in particular of the order of 5°.

Alternatively, the movement may be a movement in translation. The amplitude of the movement in translation is preferably less than 100 mm or 50 mm.

The operator can preferably effect a single manipulation or a single gesture to perform the elementary movement from the first abutment to the second abutment. For example, the gesture is a gesture of the hand of the operator, the gesture being substantially rectilinear or curvilinear. The operator preferably does not need to act to effect the return movement from the second abutment to the first abutment. This return is preferably brought about by an elastic return force.

A combination of two successive movements in translation, in particular in different directions, is not an elementary movement. A combination of two successive rotations, in particular in different directions, is not an elementary movement. A combination of successively a rotation and a translation is not an elementary movement.

Figure 7:
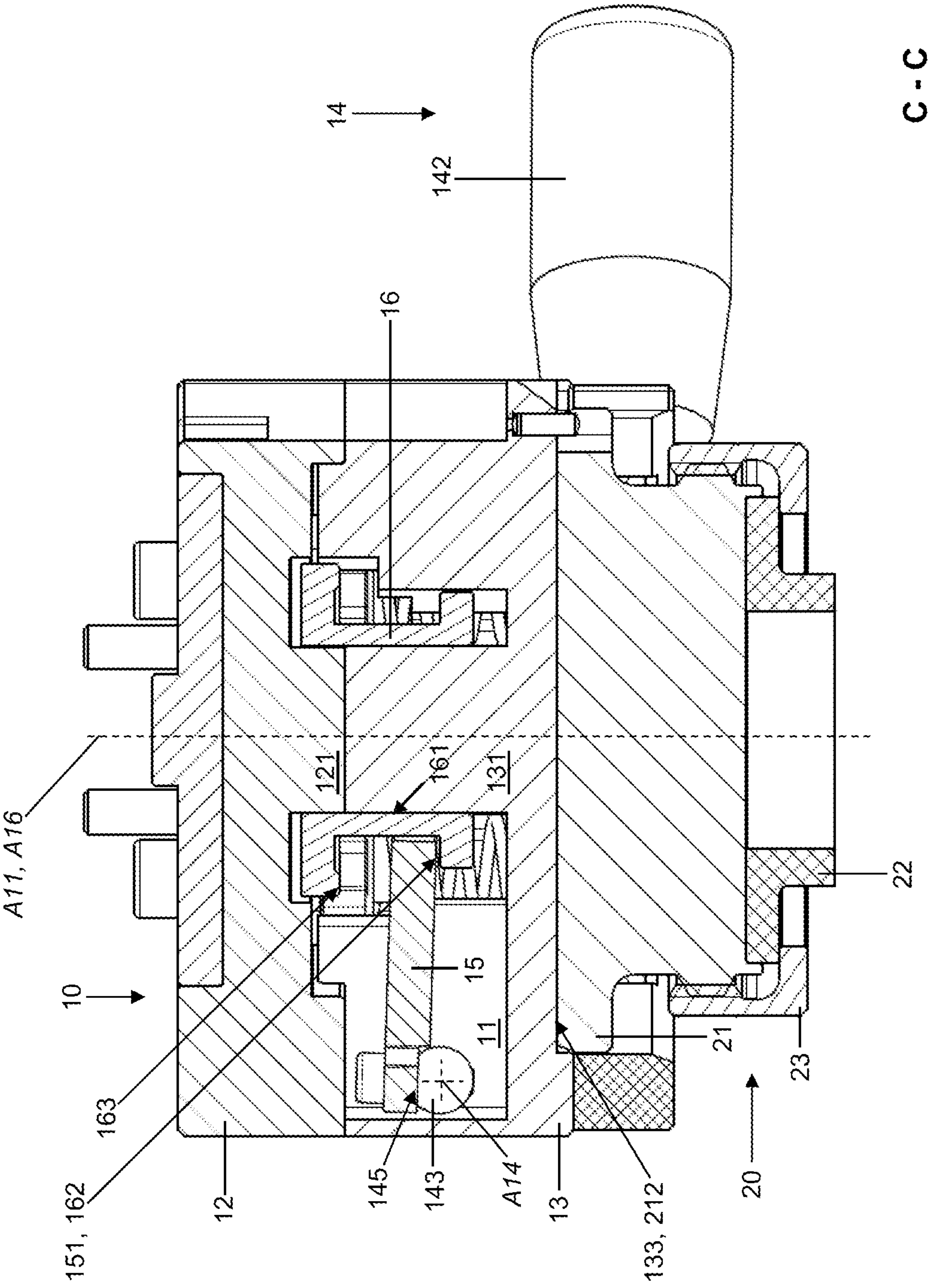
FIG. 7 is a view of the toolholder in longitudinal section on the plane C-C in FIG. 3, the retaining elements of the toolholder being in an activated position.
Figure 8:
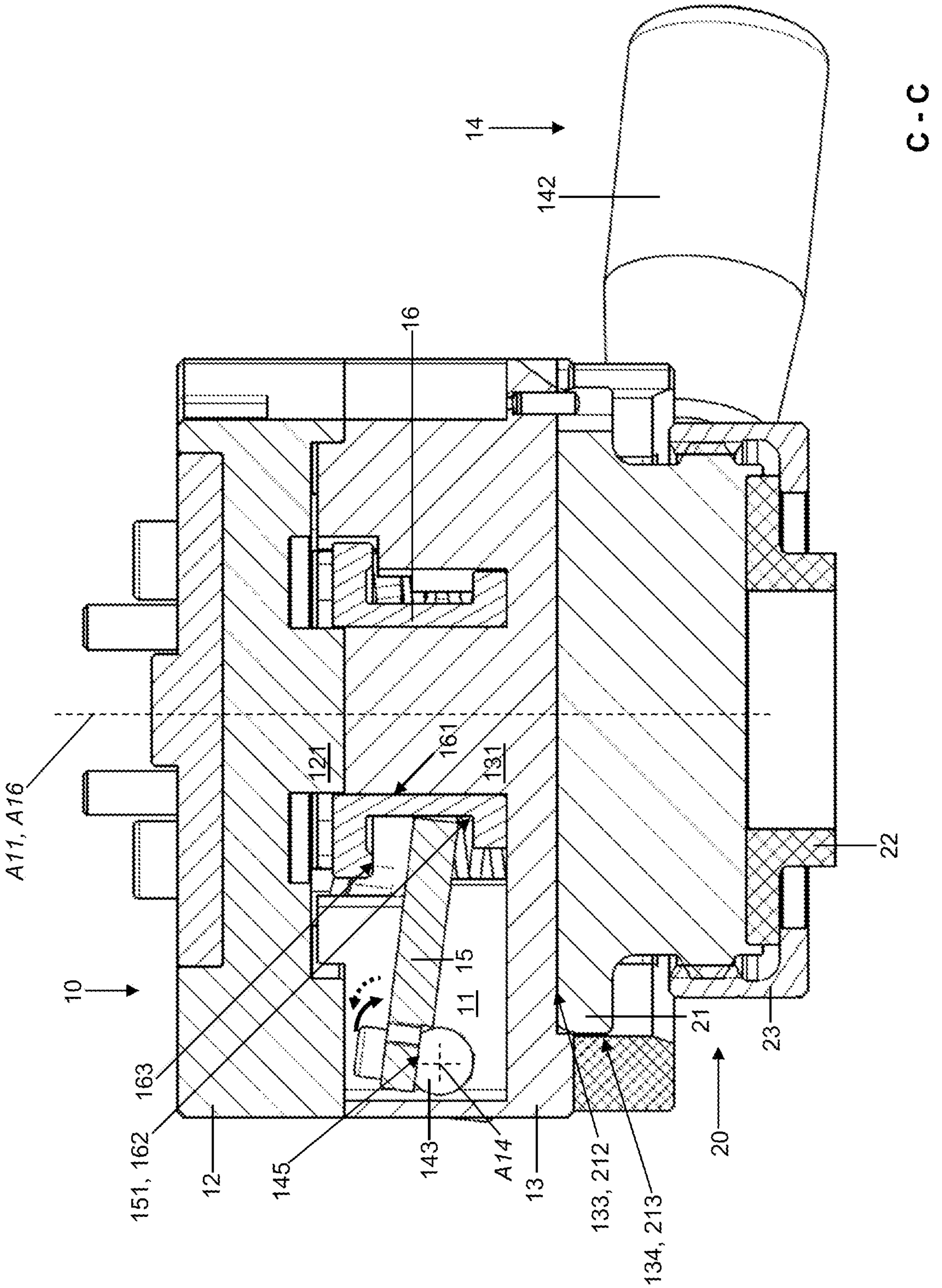
FIG. 8 is a view of the toolholder in longitudinal section on the plane C-C in FIG. 3, the retaining elements of the toolholder being in a deactivated position.

The shaft 143 comprises a fork 15, visible in particular in FIG. 4, which is for example fixed by screwing it to a flat 145 formed on said shaft (visible in FIGS. 7, 8). This fork 15 is designed to cooperate with a cam 16 having a hollow cylinder shape with axis A16 coaxial with the axis A11 of the housing 11. This cooperation is such that the cam 16 is movable, in particular in translation, because of the movement of the fork 15. As an alternative to this form of construction, the shaft 143 and the fork 15 may be in one piece.

The housing 11 is for example formed by an upper frame 12 and a lower frame 13 that are in particular fixed together by screws 123, in particular eight screws 123, in particular four pairs of screws 123 (visible in FIG. 3).

The cam 16 is preferably guided at least in translation along the axis A11, on the one hand thanks to cooperation of a first tenon 131 with axis A11 formed on the lower frame 13 with a through-opening 161 of said cam 16 and on the other hand thanks to cooperation of a second tenon 121 with axis A11 formed on the upper frame 12 with said opening 161 (visible in FIGS. 5 to 9). The cam can therefore be mounted on the frames 12, 13 with a sliding and pivoting connection relative to the axis A16.

Moreover, the cam 16 comprises a groove on its exterior periphery that defines first and second bearing surfaces 162, 163 at each of its longitudinal ends. The first bearing surface 162 is designed to cooperate with a forked end 151 of the fork 15 (more particularly visible in FIG. 4) while the second bearing surface 163 is designed to drive the retaining elements 17, for example by direct contact therewith.

Figure 5:
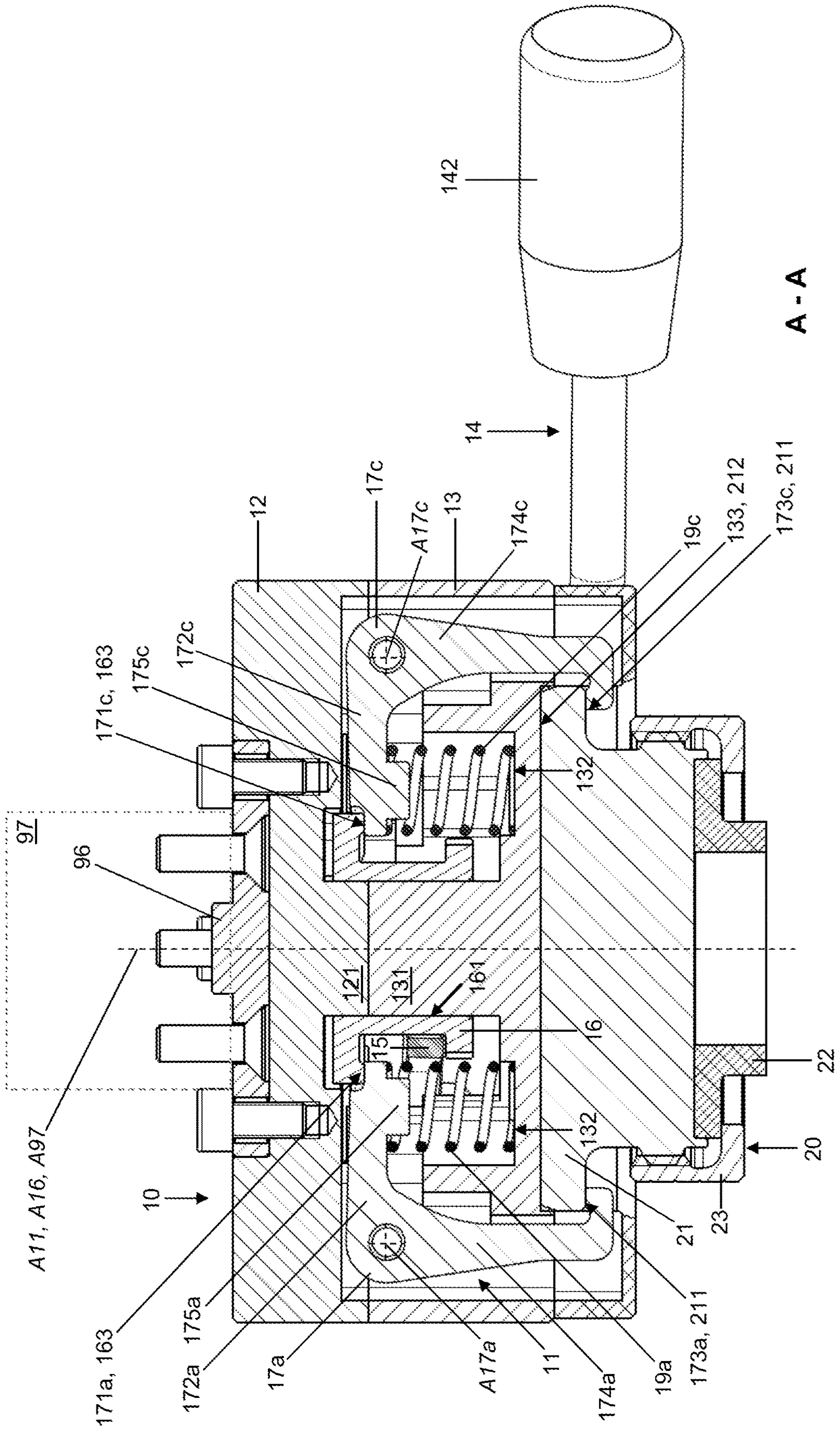
FIG. 5 is a view of the toolholder in longitudinal section on the plane A-A in FIG. 3, the retaining elements of the toolholder being in an activated position.
Figure 6:
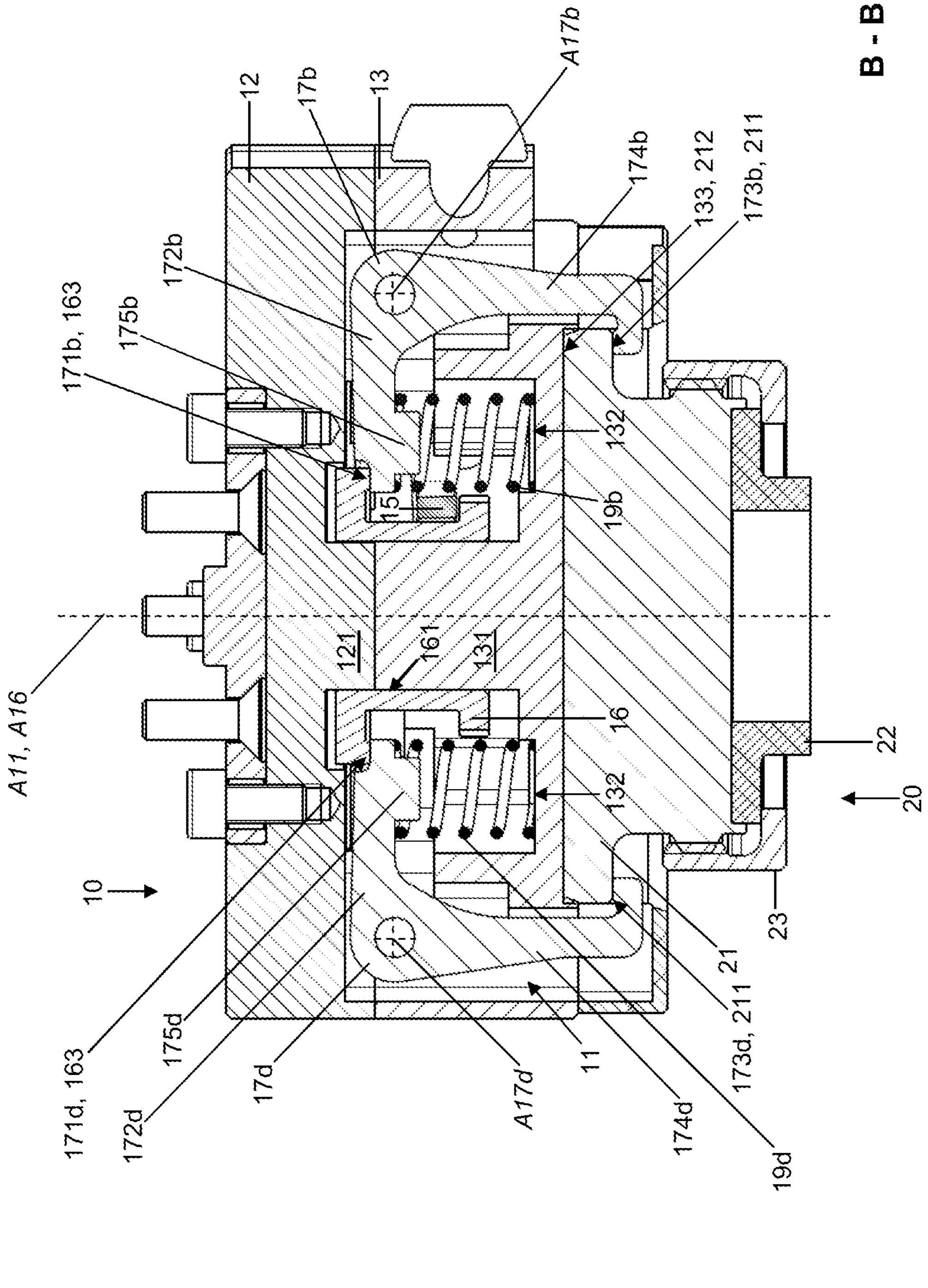
FIG. 6 is a view of the toolholder in longitudinal section on the plane B-B in FIG. 3, the retaining elements of the toolholder being in an activated position.

In this embodiment of the toolholder the retaining elements are four in number and take the form of preferably identical claws 17*a*, 17*b*, 17*c*, 17*d* which are designed to cooperate with the tool 20 in order to retain it in the housing 11 of the toolholder 10, as can be seen in FIGS. 5 to 7.

The retaining elements 17*a*, 17*b*, 17*c*, 17*d* have a bent shape or an L shape. Each of the retaining elements is articulated in rotation at the level of its bend about a respective axis A17*a*, A17*b*, A17*c*, A17*d* arranged orthoradially relative to the axis A11, in particular by means of respective pins 18*a*, 18*b*, 18*c*, 18*d* (visible in FIG. 4). The axes are therefore in a plane or in a number of planes perpendicular to the axis A11 of the toolholder 10. These claws are preferably equally distributed around the axis A11. In particular, the pins 18*a*, 18*b*, 18*c*, 18*d* are arranged orthoradially relative to the axis A11 and are preferably equally distributed around the axis A11.

Each of these claws 17*a*, 17*b*, 17*c*, 17*d* comprises a bearing surface 171*a*, 171*b*, 171*c*, 171*d* designed to cooperate, in particular by direct contact, with the second bearing surface 163 of the cam 16 and a bearing surface 173*a*, 173*b*, 173*c*, 173*d* designed to cooperate with the tool 20.

The bearing surfaces 171*a*, 171*b*, 171*c*, 171*d* and 173*a*, 173*b*, 173*c*, 173*d* are preferably parallel or substantially parallel.

The bearing surface 171*a*, 171*b*, 171*c*, 171*d* is formed at one end of a first claw portion 172*a*, 172*b*, 172*c*, 172*d* oriented radially relative to the axis A11 (in an activated position of the retaining elements) while the bearing surface 173*a*, 173*b*, 173*c*, 173*d* is formed at one end of a second portion 174*a*, 174*b*, 174*c*, 174*d* disposed perpendicularly or substantially perpendicularly to the first portion 172*a*, 172*b*, 172*c*, 172*d*.

These claws 17*a*, 17*b*, 17*c*, 17*d* are advantageously biased elastically, in particular independently of one another, against the cam 16, in particular against the second bearing surface 163 of the cam 16. The claws 17*a*, 17*b*, 17*c*, 17*d* are for example biased by separate identical or non-identical springs 19*a*, 19*b*, 19*c*, 19*d*, in particular the return forces of which may be identical or non-identical. A design of this kind advantageously makes it possible for the claws 17*a*, 17*b*, 17*c*, 17*d* to cooperate with the tool 20 independently. The retaining elements 17*a*, 17*b*, 17*c*, 17*d* are therefore movable relative to their respective axes by the cam 16.

Here these springs 19*a*, 19*b*, 19*c*, 19*d* have a helical shape. They are advantageously disposed parallel to the axis A11. They are preferably placed between a bearing surface 132 of the lower frame 13 and each of the first claw portions 172*a*, 172*b*, 172*c*, 172*d*, in particular a projection 175*a*, 175*b*, 175*c*, 175*d* on each of these first portions enabling location of the ends of the springs and preventing them from becoming skewed.

In a first configuration of the toolholder 10 the cooperation between these springs 19*a*, 19*b*, 19*c*, 19*d* and the claws 17*a*, 17*b*, 17*c*, 17*d* enables the tool 20 to be retained in the housing 11. FIGS. 5, 6 and 7 depict a first, so called operating configuration of this kind. The retaining elements are then in an activated position.

In the embodiment represented the tool 20 has a geometry, in particular a bearing surface 212, a bearing surface 211 and a periphery 213, configured to cooperate with the toolholder 10. In particular, the tool 20 comprises:

a support 21, and a driving ring 22, the driving ring 22 being fixed to the support 21. The geometry configured to cooperate with the toolholder 10 is preferably on the support 21.

FIGS. 5 and 6 depict in particular the respective bearing surfaces 173*a*, 173*b*, 173*c*, 173*d* of the claws 17*a*, 17*b*, 17*c*, 17*d* each cooperating with the bearing service 211 of the support 21 of the tool 20 so as to press the bearing surface 212 of said support 21 against a bearing surface 133 of the frame 13, the bearing surface 211 and the bearing surface 212 preferably being parallel. These bearing surfaces 133, 212 are designed to transmit the pressing forces. The actuation member 14 and the fork 15 are for their part held in position by the cam 16 that is biased elastically by the springs 19*a*, 19*b*, 19*c*, 19*d* via the claws 17*a*, 17*b*, 17*c*, 17*d* in the direction of the frame 12. In this first configuration the bearing surfaces 171*a*, 171*b*, 171*c*, 171*d* and the bearing surfaces 173*a*, 173*b*, 173*c*, 173*d* are advantageously perpendicular to the axis A11 in order to prevent all risk of the tool 20 being demounted from the toolholder 10. In this first configuration the tool 20 is advantageously centred in the housing 11 by cooperation of the exterior periphery 213 of the support 21 and a housing 134 formed in the frame 13 or a component mounted on the frame 13 (as can be seen in FIG. 8 in particular). The periphery 213 and the housing 134 preferably have complementary cylindrical shapes.

FIG. 8 depicts a phase of actuation of the member 14, in particular a phase of "downward" actuation of the handle 142 causing rotation of the shaft 143 and of its fork 15 in the clockwise direction about the axis A14, as represented by the continuous line arrow in FIG. 8. This rotation drives movement in translation of the cam 16 toward the frame 13 against the action of the springs 19*a*, 19*b*, 19*c*, 19*d*. A consequence of this is to cause rotation of the claws 17*a*, 17*b*, 17*c*, 17*d* about their respective axes A17*a*, A17*b*, A17*c*, A17*d* so as to enable them to move away from the tool 20, in particular from the support 21.

Figure 9:
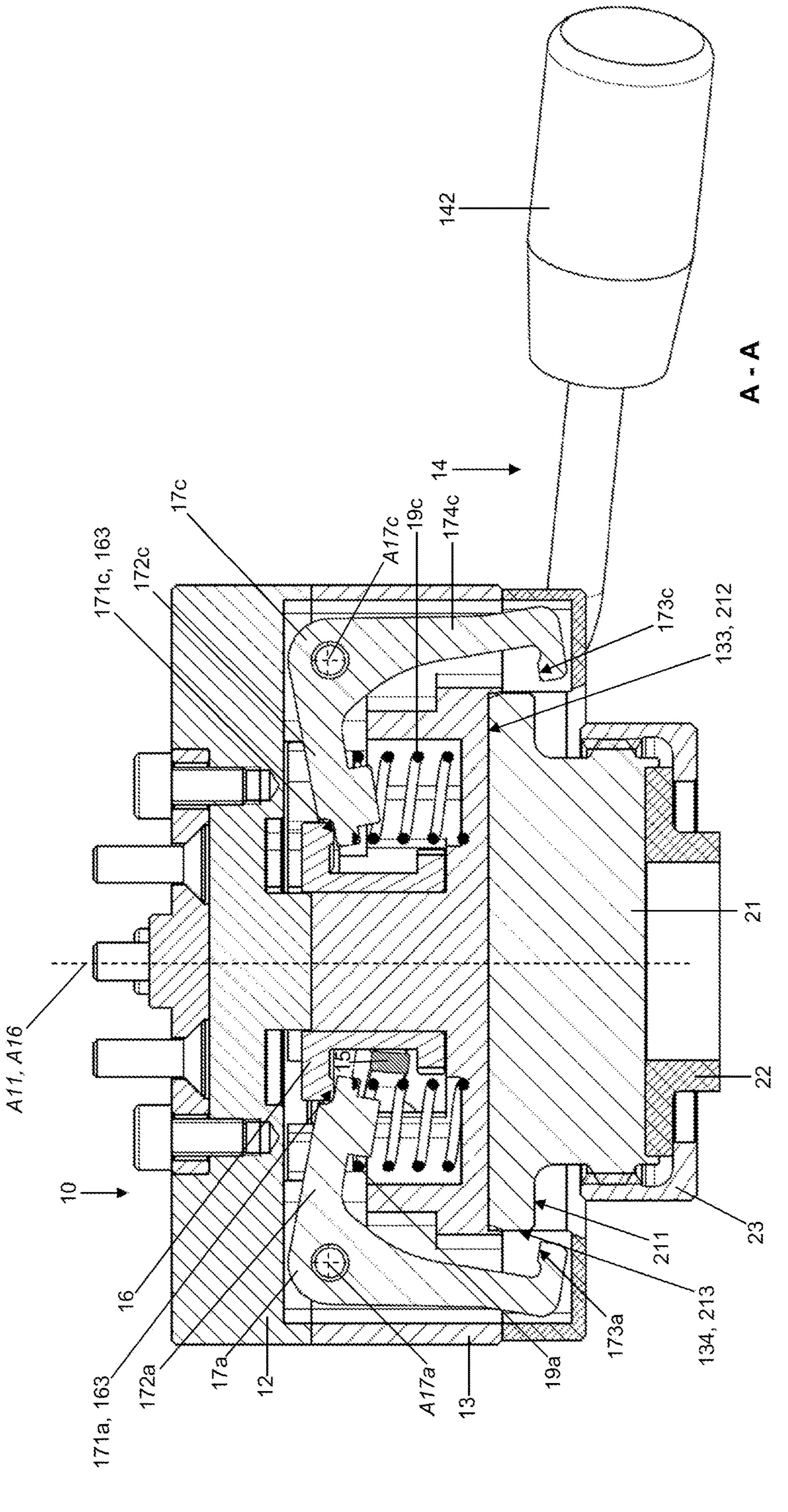
FIG. 9 is a view of the toolholder in longitudinal section on the plane A-A in FIG. 3, the retaining elements of the toolholder being in a deactivated position.

FIG. 9 depicts by way of example the claws 17*a* and 17*c* once retracted from the support 21, that is to say in a position in which the retaining elements, in particular the claws, are deactivated. Their respective positions make it possible to define a second configuration of the toolholder 10, termed the mounting/demounting configuration. In this second configuration the bearing surfaces 173*a* and 173*c* are in particular far from the bearing surface 211 to allow movement of the surfaces 133 and 212 and therefore to enable demounting of the tool 20 from the toolholder 10. Here this second configuration is obtained by holding down the handle 142 because the latter is subjected to the return forces exerted by each of the springs 19*a*, 19*b*, 19*c*, 19*d* via the cam 16 and the fork 15. Once the handle 142 has been released, it therefore returns to its "high" position because of the action of these springs, which causes rotation of the shaft 143 and of its fork 15 in the anticlockwise direction about the axis A14, as represented by the dashed line arrow in FIG. 8. The actuation member 14 is therefore biased elastically by the elastic element 19*a*, 19*b*, 19*c*, 19*d*, in particular via the cam 16 kinematically connecting the actuation member 14 and the elastic element 19*a*, 19*b*, 19*c*, 19*d*. Consequently, the operator does not have to act for the toolholder 20 to return to the operating configuration, namely a configuration in which the retaining elements are in the activated position.

One embodiment of a method of operating a toolholder according to the invention is described hereinafter.

The operating method comprises the following steps for removing a tool 20 previously mounted in the toolholder 10:

a step of movement of the actuation member 14 in a first direction, in particular of elementary movement in a first direction of the actuation member 14, by an operator, this step leading to:

a step of deactivation of the retaining elements 17*a*, 17*b*, 17*c*, 17*d* by virtue of the movement step leading to release of said tool 20.

The step of moving the actuation member 14 is a step of movement from a first position to a second position in a first direction, in particular rotation of the actuation member 14 in a first direction so as to reach the second configuration of the toolholder and therefore to allow demounting of a tool previously mounted in the housing 11 of the toolholder 10.

To mount a new tool 20 in the toolholder 10 in which there is no tool the operating method comprises, consecutively to the steps described above for bringing the retaining elements into the deactivated position (and to remove a tool if any in the toolholder), the following steps:

a step of retaining the retaining elements 17*a*, 17*b*, 17*c*, 17*d* in the deactivated position, a step of introducing a tool 20 into the toolholder 10, a step of movement of the actuation member 14 in a second direction opposite the first direction, in particular a step of elementary movement in the second direction of the actuation member. This movement is preferably brought about by the elastic return element 19*a*, 19*b*, 19*c*, 19*d* when the operator releases the actuation member 14. This movement in the second direction reconfigures the toolholder in the operating configuration, the retaining elements being brought into their activated position. The toolholder 10 is therefore configured and/or arranged so that the retaining elements are movable from a deactivated position to an activated position by virtue of a movement in a second direction opposite the first direction of the actuation member 14, in particular by virtue of an elementary movement in the second direction of the actuation member 14.

Alternatively, to mount a new tool 20 in the toolholder 10 in which there is no tool the operating method comprises the following steps with the retaining elements located in the activated position:

a step of bringing the tool 20 and the toolholder 10 into contact, a step of the tool 20 applying a force to the toolholder 10 so as to retract the retaining elements 17*a*, 17*b*, 17*c*, 17*d* and to place the tool 20 in the toolholder 10, and a step of the elastic return elements 19*a*, 19*b*, 19*c*, 19*d* activating the retaining elements 17*a*, 17*b*, 17*c*, 17*d*.

To perform the retraction operation, the tool and the retaining elements preferably have chamfered surfaces or cam surfaces enabling tilting of the retaining elements against springs when an axial force (along the axis A11) is exerted by the tool 20 on the toolholder 10. It is therefore possible to introduce the tool into the housing of the toolholder without previously manipulating the actuation member. Nevertheless, in this situation, the movement of the retaining elements causes the movement of the actuation member (in the absence of an additional clutch system). Thus the toolholder is configured and/or arranged so that the retaining elements are movable from an activated position (with no tool) to an activated position (with the tool in place) via a deactivated position. The passage from the activated position (with no tool) to the deactivated position is achieved by a tool applying a force against the toolholder. The passage from the deactivated position to the activated position (with the tool in place) is produced by the action of the elastic return elements.

Consequently, movement of the actuation member in a first direction causes separation of the retaining elements or vice versa. Moreover, movement of the actuation member in a second direction opposite the first direction causes tightening of the retaining elements.

In the embodiment described the actuating elements are articulated about rotation axes in a plane or a plurality of planes perpendicular to the geometric axis of the housing of the toolholder. However, as an alternative, the actuation member and/or the retaining elements may be articulated about rotation axes parallel or substantially parallel to the geometric axis of the housing of the toolholder. For example, the retaining elements could be arranged in the same manner as the blades of an iris diaphragm. In this case the actuation member could for example be mobile in rotation about the geometric axis of the housing of the toolholder.

More generally, the actuation member and/or the retaining elements may be moved in any other type of movement, such as movement in translation for example.

In addition to the retaining elements the toolholder and/or the tool may comprise foolproofing means in order to guarantee correct angular orientation of the tool relative to the toolholder and/or of the tool relative to the first component.

In the embodiment described the slider 97 is fixed to the toolholder 10 by screwing it thereto via a plate 96 itself fixed to the frame 12 by screws 122, in particular four screws 122 (as can be seen in FIGS. 3 and 5). Of course, any other assembly solution could be used.

In the embodiment described the tool comprises a support 21, a driving ring 22 designed to come into contact with the first component 1, and an assembly ring 23 designed to enable fixing of the driving ring 22 to the support 21, in particular by screwing it thereto. To this end the support 21 comprises an external thread on an exterior wall designed to cooperate with an internal thread in a receiving portion of the assembly ring 23. Of course, the tool 20 could take any other form. For example, it could be in one piece. Alternatively, it could take the form of a more complex assembly and in particular comprise one or more springs designed to absorb the driving force.

The first and second components 1 and 2 are preferably horological components. In a first example the first component may be an external component like a bezel disc and the second component may be an external component like a bezel ring. In a second example the first component may be an external component such as a crystal (possibly comprising a seal) and the second component may be an external component such as a middle (possibly comprising a seal). The first and second components may equally take the form of components of the movement. In a third example the first component may be a gear and the second component may be a shaft. In a fourth example the first component may be a jewel and the second component may be a movement blank.

In the embodiment described the press is a press for driving two components, in particular two horological components. It is entirely possible to use a toolholder of this kind in a press to enable riveting or crimping of two components.

In the embodiment described the toolholder is designed to be manipulated by an operator. Because of its conformation, it may equally and advantageously be manipulated by an automated device. For example, that device may comprise a motor, in particular a motor shaft, in direct or indirect interengagement with the actuation member 14. In particular the motor may be actuated by an operator by means of an auxiliary control such as a pushbutton. A solution of this kind may be particularly advantageous depending on the conformation or the environment of the press. The automated device enables automation of the manoeuvres of the actuation member.

Thus the invention is not limited to a toolholder the actuation member 14 of which can be manoeuvred manually.

The solutions described above have the particular feature of comprising an actuation member and retaining elements, those retaining elements being designed to enable the mounting on or demounting from a toolholder of a tool by virtue of a simple manipulation of the actuation member.

In particular, movement of the actuation member in a first direction causes movement of the retaining elements away from one another and therefore enables demounting of a tool from the toolholder while a movement of the actuation member in a second direction opposite the first causes tightening of the retaining elements and therefore enables retention or even mounting of a tool on the toolholder.

The first direction may be a clockwise direction, as represented by the continuous line arrow in FIG. 8, and the second direction may be an anticlockwise direction, as represented by the dashed line arrow in FIG. 8. Alternatively, the first direction may be an anticlockwise direction and the second direction a clockwise direction.

The solutions described improve the comfort of the user during the operation of changing tools for a press or the like by proposing a toolholder on the one hand enabling optimum facilitation of the operation of mounting or demounting a tool and on the other hand minimising the time necessary for said operation.

As seen above, the movement of the retaining elements in at least one direction is advantageously effected by virtue of the movement of the actuation member, differing in this from the solutions known from the prior art in which it is necessary to effect movements of the tool and/or of the toolholder to enable movement of the retaining elements. In other words, the retaining elements are moveable relative to the toolholder by virtue of the movement of the actuation member.

The invention claimed is:

1. A toolholder for a press having:
an actuation member,
a fork actuated in movement by the actuation member,
a cam cooperating with the fork so that the cam is movable by movement of the fork, and
retaining elements arranged to retain a tool, the retaining elements being movable relative to respective axes of the retaining elements by the cam,
the toolholder being configured and/or arranged so that the retaining elements are movable from an activated position to a deactivated position by virtue of a movement in a first direction of the actuation member.

2. The toolholder according to claim 1, wherein the toolholder is configured and/or arranged so that the retaining elements are movable from a deactivated position to an activated position by virtue of a movement in a second direction opposite the first direction of the actuation member.

3. The toolholder according to claim 1, wherein the toolholder is configured and/or arranged so that the retaining elements are movable from a deactivated position to an activated position by introduction of a tool into the toolholder.

4. The toolholder according to claim 1,
wherein the actuation member is articulated in rotation about an axis and/or
wherein the retaining elements are articulated in rotation about axes.

5. The toolholder according to claim 1,
wherein the retaining elements are claws each featuring a respective bend, and
wherein:
each claw is articulated in rotation at the level of the respective bend, in particular by means of a pin mounted in a frame of the toolholder, and/or
the claws are distributed equally or substantially equally around an axis of the toolholder.

6. The toolholder according to claim 1, wherein the retaining elements are biased elastically by an elastic return element.

7. The toolholder according to claim 6, wherein the actuation member is elastically biased by the elastic elements.

8. The toolholder according to claim 1, wherein the actuation member comprises:
a lever adapted to be actuated, and
a shaft articulated about an axis, the shaft comprising the fork or the shaft and the fork being fixed to each other,
the lever and the shaft being fixed to each other.

9. A tool comprising:
a support having a geometry configured to cooperate with a toolholder for a press, the toolholder having an actuation member, a fork actuated in movement by the actuation member, a cam cooperating with the fork so that the cam is movable by movement of the fork, and retaining elements arranged to retain a tool, the retaining elements being movable relative to respective axes of the retaining elements by the cam, the toolholder being configured and/or arranged so that the retaining elements are movable from an activated position to a deactivated position by virtue of a movement in a first direction of the actuation member, and
a driving ring.

10. A press comprising the toolholder according to claim 1.

11. A method of operating the toolholder according to claim 1, wherein the method comprises:
causing a movement of the actuation member in a first direction, performed by an operator,
deactivating the retaining elements by the movement, leading to release of a tool.

12. A method of operating the toolholder according to claim 1, wherein the method comprises:
causing a first movement of the actuation member in a first direction, performed by an operator,
deactivating the retaining elements by virtue of the first movement,
introducing a tool into the toolholder,
causing a second movement of the actuation member in a second direction opposite the first direction, by an elastic return element.

13. The method according to claim 11, wherein the method comprises:
bringing a tool and the toolholder into contact,
causing application of a force by the tool to the toolholder (10) so as to retract the retaining elements and to place the tool in the toolholder,
activating the retaining elements by an elastic return element.

14. The method according to claim 12, wherein the method comprises:
bringing the tool and the toolholder into contact,
causing application of a force by the tool to the toolholder so as to retract the retaining elements and to place the tool in the toolholder,
activating the retaining elements by the elastic return element.

15. The method of operating the toolholder according to claim 11, wherein the movement of the actuation member in the first direction is an elementary movement.

16. The method of operating the toolholder according to claim 12, wherein the first movement of the actuation member in the first direction is a first elementary movement, and wherein the second movement of the actuation member in the second direction is a second elementary movement.

17. The toolholder according to claim 2, wherein the movement of the actuation member in the first direction of the actuation member is a first elementary movement, and the movement in the second direction of the actuation member is a second elementary movement.

18. The toolholder according to claim 4, wherein the retaining elements are articulated in rotation about axes, the axes being in a plane or in a plurality of planes perpendicular to an axis of the toolholder.

* * * * *